United States Patent
Ren et al.

(10) Patent No.: US 11,249,785 B2
(45) Date of Patent: Feb. 15, 2022

(54) UNIFIED APPLICATION NOTIFICATION FRAMEWORK

(71) Applicant: Citrix Systems, Inc., Fort Lauderdale, FL (US)

(72) Inventors: Mingming Ren, Nanjing (CN); Yue Yao, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 208 days.

(21) Appl. No.: 16/448,569

(22) Filed: Jun. 21, 2019

(65) Prior Publication Data

US 2020/0310858 A1 Oct. 1, 2020

Related U.S. Application Data

(63) Continuation of application No. PCT/CN2019/080850, filed on Apr. 1, 2019.

(51) Int. Cl.
*G06F 9/455* (2018.01)
*G06F 9/54* (2006.01)
*G06F 3/0481* (2013.01)
*G06F 3/04817* (2022.01)

(52) U.S. Cl.
CPC ...... *G06F 9/45558* (2013.01); *G06F 3/04817* (2013.01); *G06F 9/542* (2013.01); *G06F 2009/45595* (2013.01)

(58) Field of Classification Search
CPC .. G06F 9/45558; G06F 3/04817; G06F 9/542; G06F 2009/45595
See application file for complete search history.

(56) References Cited

U.S. PATENT DOCUMENTS

| | | | |
|---|---|---|---|
| 9,077,745 B1* | 7/2015 | Kline | G06F 21/577 |
| 2003/0096625 A1* | 5/2003 | Lee | G06Q 30/02 |
| | | | 455/466 |
| 2013/0185667 A1* | 7/2013 | Harper | G06F 11/0751 |
| | | | 715/772 |

(Continued)

FOREIGN PATENT DOCUMENTS

| | | |
|---|---|---|
| WO | 2016138684 A1 | 9/2016 |
| WO | 2017201655 A1 | 11/2017 |
| WO | 2017206136 A1 | 12/2017 |

OTHER PUBLICATIONS

Dec. 27, 2019—(WO) International Search Report and Written Opinion—App. No. PCT/CN2019/080850 (pp. 1-9).

*Primary Examiner* — Emerson C Puente
*Assistant Examiner* — Jonathan R Labud
(74) *Attorney, Agent, or Firm* — Banner & Witcoff, Ltd.

(57) ABSTRACT

Methods and systems for a unified application notification framework are described herein. A server may receive a notification from a service provider. The service provider may be associated with an application executable on a virtual machine. The virtual machine may be part of a virtual environment that includes a user interface. The server may determine an identifier for the received notification. The identifier may indicate the application on the virtual machine associated with the service provider. The server may provide the received notification to the user interface for display to a user. The received notification may be displayed without execution of the application on the virtual machine.

16 Claims, 8 Drawing Sheets

(56) References Cited

U.S. PATENT DOCUMENTS

| | | | |
|---|---|---|---|
| 2014/0075438 A1* | 3/2014 | He | G06F 9/45533 718/1 |
| 2015/0012837 A1 | 1/2015 | Momchilov et al. | |
| 2016/0134616 A1* | 5/2016 | Koushik | H04L 63/08 726/9 |
| 2017/0344385 A1 | 11/2017 | Asami | |
| 2018/0205715 A1 | 7/2018 | Ingale et al. | |
| 2019/0104382 A1* | 4/2019 | Lalka | H04L 51/20 |

* cited by examiner

UNIFIED APPLICATION NOTIFICATION FRAMEWORK

CROSS-REFERENCE TO RELATED APPLICATIONS

This application is a continuation of Application No. PCT/CN2019/080850, filed Apr. 1, 2019, which is hereby incorporated by reference in its entirety.

FIELD

Aspects described herein generally relate to computer networking, remote computer access, virtualization, enterprise mobility management, and hardware and software related thereto. More specifically, aspects described herein relate to a notification framework for virtual applications.

BACKGROUND

Current virtual desktop and application products are typically composed of a frontend through which users can interact with virtual applications, and a backend that manages the virtual resources and instances. Applications may receive messages from backend services and generate notifications for the user.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

The unified application notification framework may receive a notification associated with a virtual application instance, via a notification application programming interface (API), operating system-level interception, and service-to-service notification channel. The notification may be triaged and filtered.

The notification API notification may be received from the virtual application instance through an API call native to the unified application notification framework. The operating system-level notification interception message may be generated based on a virtual notification sent by the virtual application instance to a virtual operating system instance, on which the virtual application instance is executing. The service-to-service notification may be generated by a backend service that services the virtual application instance.

The unified application notification framework may send the notification to the client workspace.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
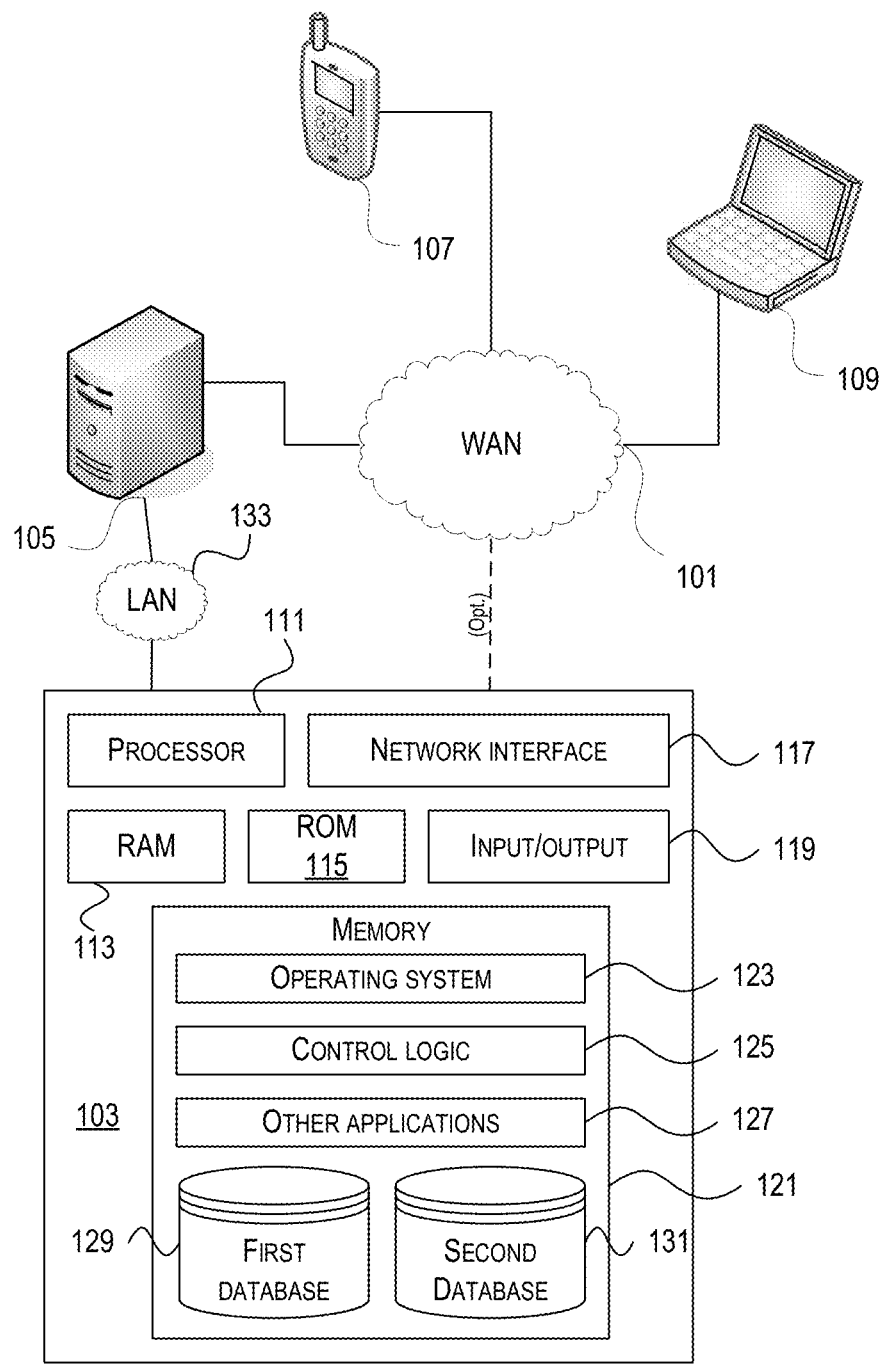
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

Conventional cloud products lack a reliable notification mechanism between the backend application instances and the frontend user interface. For example, a backend application instance may be a Microsoft Outlook® email client application running in a virtual Windows® desktop environment. The frontend user interface may be Citrix Workspace®. The backend application instances typically have no way of alerting the frontend user interface directly, and thus when an application issues a notification, the user may not be notified until she spontaneously opens that application. For example, if the user were to receive an email message via an email client running on a host operating system of the local computer, the email client may send a notification message to the host operating system running on the local computer and the user may be instantly alerted with the notification. However, if the email message arrives at a virtual instance of an email client running on a virtual machine, the host operating system running on the local computer may have no way of knowing that the new email has arrived, and the user may not discover the arrival of the new email until she actively launches a virtual desktop user interface to access the virtual machine and/or launches the virtual instance of the email client. Thus, a reliable notification framework in virtualization environments is needed to improve the user experience.

To overcome limitations in the prior art described above, and to overcome other limitations that will be apparent upon reading and understanding the present specification, aspects described herein are directed towards a unified application notification framework.

As a general introduction to the subject matter described in more detail below, aspects described herein are related to a unified notification framework for cloud and/or virtualized applications. Users may receive notifications without having to open virtualized or cloud applications to check each individually for notifications, thus improving the user experience and customer satisfaction. More specifically, the present disclosure allows a frontend user interface to receive notification messages related to a backend application instance via a unified application notification framework and through one of multiple communication channels. Thus, the user may receive pertinent information about the backend application instance more quickly and more efficiently because the information is made more readily available to the user.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," "engaged" and similar terms, is meant to include both direct and indirect connecting, coupling, and engaging.

As used herein and depicted in the drawings, the term "notification" (also referred to as a message or a notification message) refers to any type of data or information that is generated by an application or operating system and contains a message for the same or other applications and operating systems. A notification is often relatively small in size (e.g., a few bytes to a few kilobytes) although there is no limit to its size. The sender and the receiver of a notification message may need to agree beforehand on the format and delivery method of the message. The recipient of the notification may further process the notification by presenting relevant information to the user. For instance, the notification may be presented to a user visually on a screen (e.g., a text, an icon, a pop-up, a dialog box, a status bar, a toast, a tile, a badge, an alert, a counter, etc.), audibly through a speaker (e.g., an alarm, a ringtone, an audio alert, etc.), or through any other means (e.g., vibration, haptic feedback, etc.). As an example, an email client, upon receiving a new email, may send a notification to the operating system on which the email client is executing such that the operating system may alert the user about the new email via a pop-up dialog.

The received notification may be "cleared" or otherwise removed from the application or system once the user manually acknowledges (e.g., reads) the notification or automatically cleared after the notification is presented to the user. Alternatively, a notification may be cleared after a certain amount of time (e.g., 1 hour, 1 day, 2 weeks, 3 months, etc.) elapses after the receipt of the notification. Cleared (or expired) notification may no longer be presented to the user.

COMPUTING ARCHITECTURE

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects described herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) interfaces 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
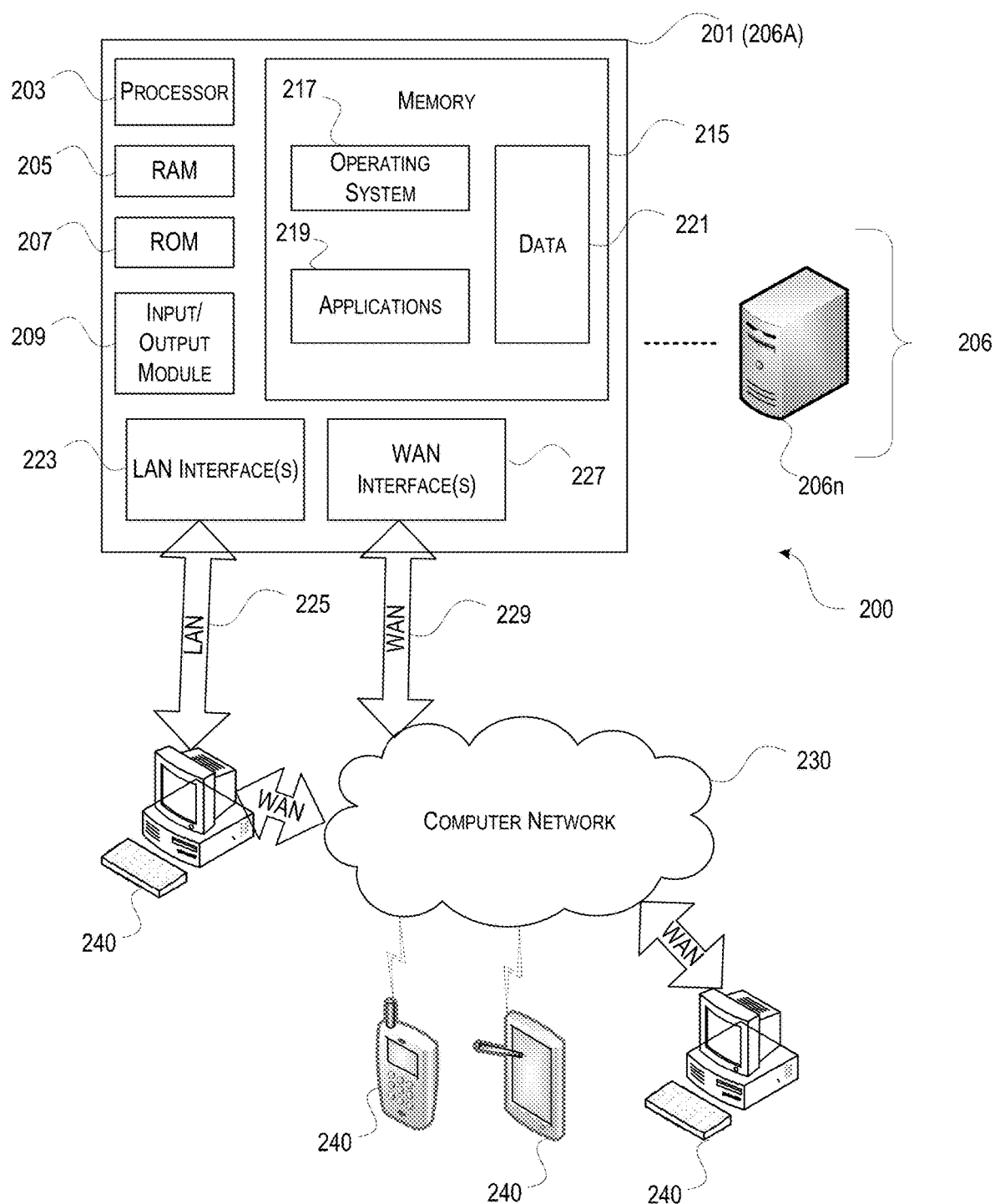
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown). First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
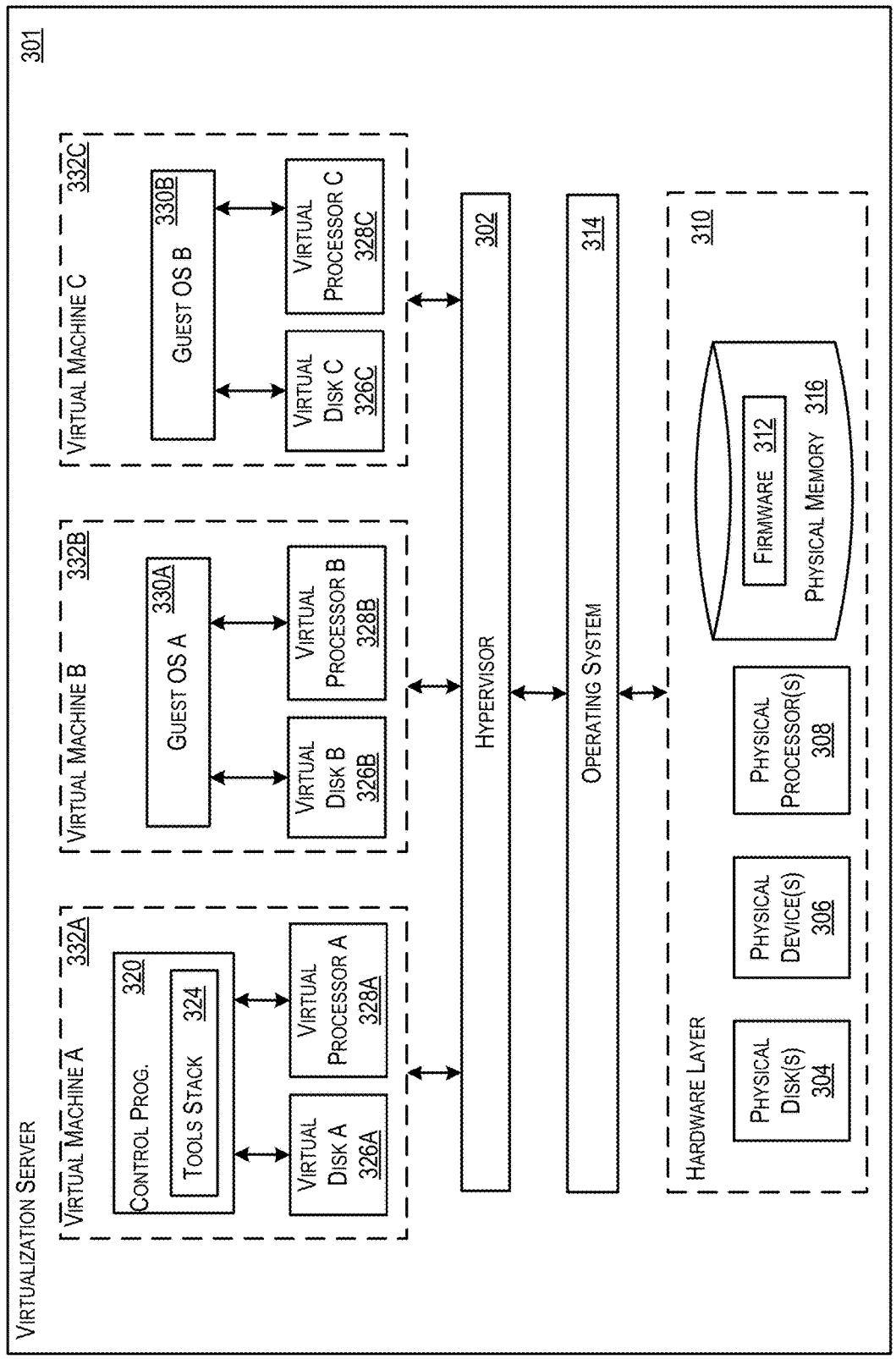
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B (generally 330).

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and/or hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
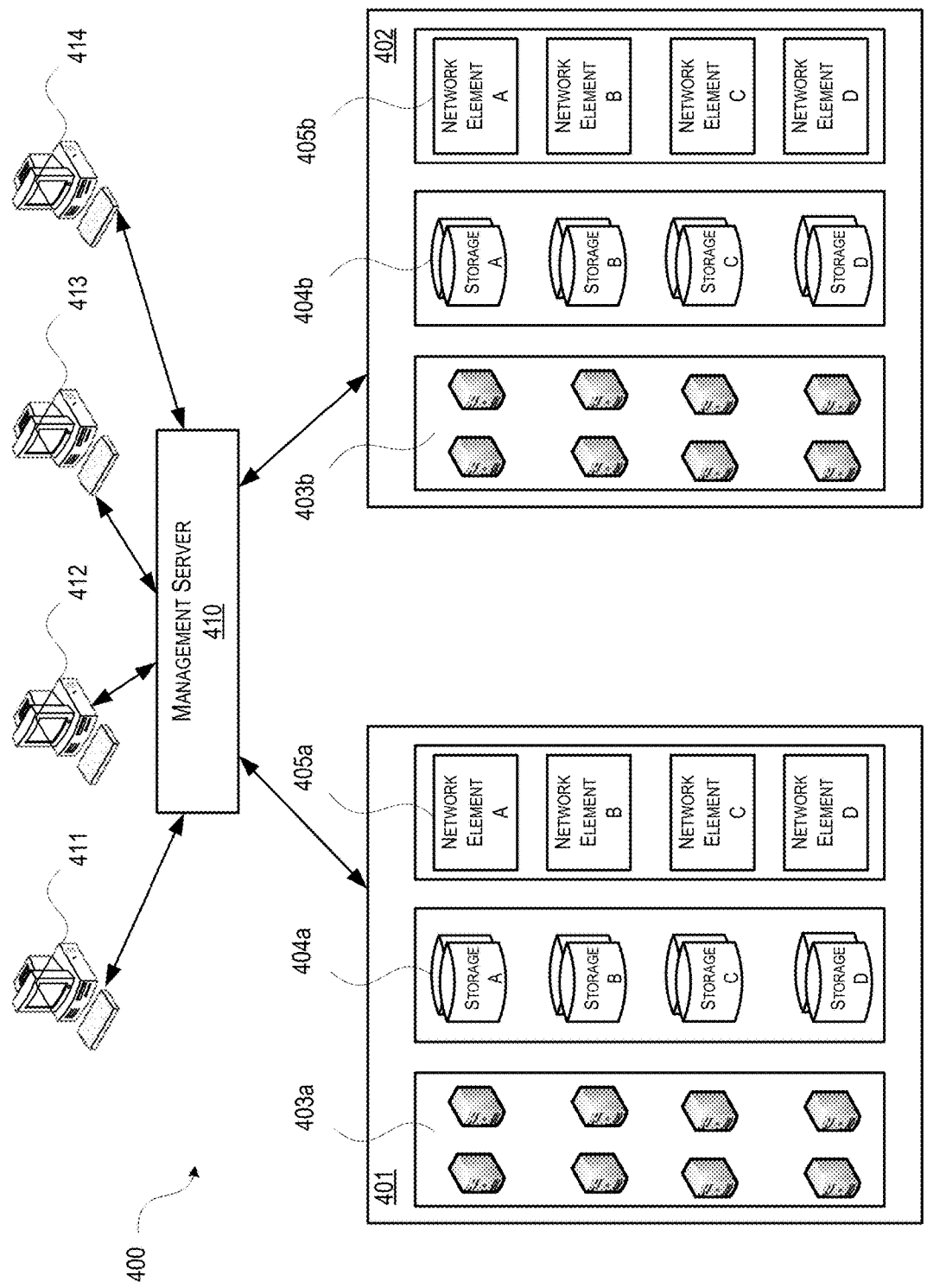
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Workspace by Citrix Systems, Inc. of Ft. Lauderdale, Fla., or OpenStack, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond, Wash.), AMAZON EC2 (Amazon.com Inc. of Seattle, Wash.), IBM BLUE CLOUD (IBM Corporation of Armonk, N.Y.), or others.

Unified Notification Framework

Figure 5:
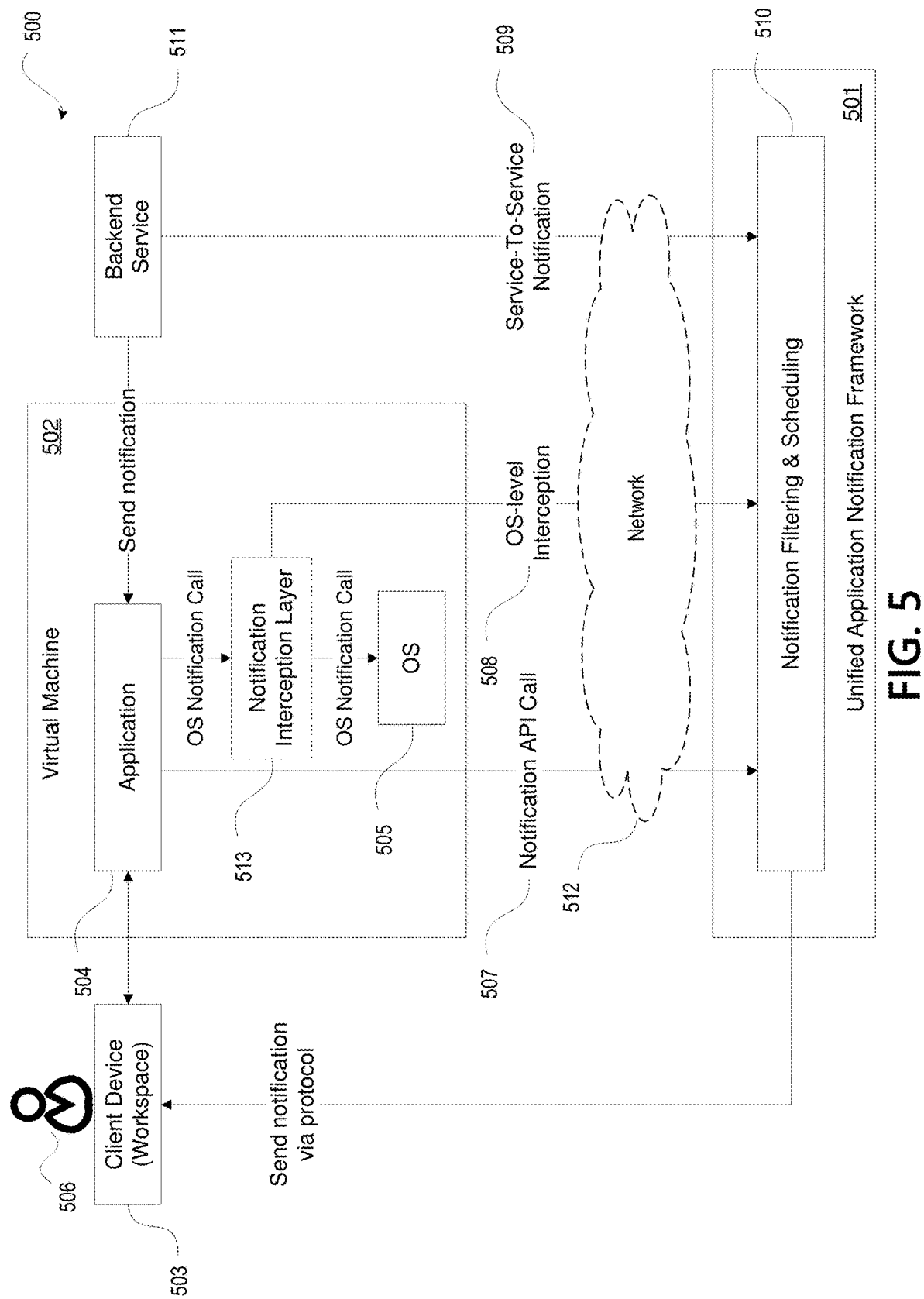
FIG. 5 depicts an illustrative unified application notification framework.

FIG. 5 depicts an illustrative unified application notification framework. In some embodiments, a unified application notification environment 500 may include a unified application notification framework 501 that collects notifications from a virtual machine 502 and relay all or part of the notifications to a client device 503. Specifically, the notifications may be issued by an application 504 executing on the virtual machine 502 and be forwarded to the workspace of the client device 503 such that a user 506 of the client device 503 may be notified. The virtual machine 502 may be, for example, one of virtual machines 332 of FIG. 3. The client device 503 may be one of network nodes 103, 105, 107, 109 of FIG. 1 or terminals 240 of FIG. 2. The client device 503 may have a workspace environment (also referred to as a workspace or a virtual environment) that allows the user 506 to access the virtual machine 502, an operating system 505, and/or the application 504. Throughout this disclosure, the client device 503 may refer to hardware (e.g., a physical device such as a desktop computer, a mobile device, etc.) and/or any software (e.g., workspace environment) that runs on the hardware. The workspace may be a web interface, a desktop application, a mobile application, etc. Although the application 504 and/or the operating system 505 running on the virtual machine 502 may be able to send notifications directly to the client device 503 when the client device 503 is online and connected to the virtual machine 502 (e.g., engaged in a remote session), such direct delivery of notifications may be unavailable to the application 504 and the operating system 505 when the client device 503 is offline or otherwise unavailable for communication with the application 504 or the operating system 505. In such a case, the unified application notification framework 501 may receive or intercept notifications associated with the application 504 and forward those messages to the client device 503 in real time or at a later time.

The unified application notification framework 501 may be a collection of software and/or hardware components that enables the client device 503 to receive notifications associated with the application 504 even when the client device 503 is not actively communicating with the application 504 and/or the virtual machine 502. For example, all or part of the unified application notification framework 501 may be running on server(s) 206 of FIG. 2 or client machine(s) 240. Although FIG. 5 illustrates the unified application notification framework 501 as receiving notifications from a single virtual instance and forwarding the notifications to a single client device 503 for simplicity of illustration, the unified application notification framework 501 may receive notifications from multiple virtual machines and forward the notifications to multiple corresponding client devices. For clarity of illustration, it will be assumed in this disclosure that the unified application notification framework 501 is included in hypervisor 302 of FIG. 3. However, in some embodiments, all or part of the unified application notification framework 501 may be included in hypervisor 302, operating system 314, control program 320, and/or guest operating system 330 of FIG. 3. In other embodiments, the unified application notification framework 501 may be part of an entity (e.g., a server) that is logically and/or physically separate from client machine(s) 240, server(s) 206, and virtualization server 301. For example, the unified application notification framework 501 may reside in management server 410 or other devices.

The unified application notification framework 501 may have at least three communication channels (also referred to as notification channels) through which it receives notifications from the virtual machine 502. These communication channels may include a notification API 507, operating system-level notification interception 508, and service-to-service notification 509. These may be independent notification channels, by which various types of notifications may be retrieved and collected. Regardless of which communication channel or path is used for delivery, the notification may be delivered to the unified application notification framework 501 via a network 512 (e.g., the Internet). For example, the application 504 may make a native notification API call (i.e., the notification API 507) and send the notification over the Internet, a wireless broadband communication network, a local area network (LAN), a wide area network (WAN), a virtual network, etc. In some embodiments, one or more of the communication channels 507, 508, 509 may not need to traverse the network 512 as when, for example, the virtual machine 502 and the unified application notification framework 501 are located within the same physical server.

The unified application notification framework 501 may further include notification filtering and scheduling module 510 that further processes the received notifications before forwarding them to the client device 503. In particular, a notification filtering and scheduling module 510 may triage and filter messages in accordance with policies or preferences. The policies or preferences may be predetermined (e.g., by an administrator or user) or dynamically updated. For example, a filtering policy may dictate that any redundant or repetitive message may be discarded and prevented from being forwarded to the client device 503. The filtering policy may, for instance, be updated according to message history (e.g., blocking certain types of repeated messages) or user preference (e.g., whitelisting all messages originating from a certain application). The notification filtering and scheduling module 510 may also decide to forward one or more notifications to the client device 503 sometime later than the time at which the notifications are received at the unified application notification framework 501. In other words, the unified application notification framework 501 may, according to a policy or setting, schedule or reschedule delivery of notifications to the client device 503. For example, when a notification arrives at the unified application notification framework 501 at a time when the user 506 is unavailable to see the notification, the notification filtering and scheduling module 510 may schedule the delivery of the message for a future time when the user 506 will be available. As another example, when the client device 503 is powered off, offline, or otherwise unavailable to receive notifications (e.g., when the unified notification framework 501 fails to receive a notification receipt acknowledgement message back from the client device 503), the unified application notification framework 501 may reschedule the delivery for a future time to retry.

Some notifications may be received via the notification API 507. The notification API notification channel 507 may be based on an API that is native to the unified application notification framework 501, and thus may also be referred to as native notification API. An API refers to a set of functions, methods, procedures, subroutines, definitions, protocols, and/or data that are designed to allow an application, operating system, service, etc. access to features or data of the same or other application, operating system, service, etc. The native API (also referred to as a proprietary API) of the unified application notification framework 501 may be an API that is written or designed specifically for accessing features of the unified application notification framework 501. The application 504 that is designed to take advantage of this native API (e.g., the API is integrated into the application 504) may make an appropriate API call for issuing a notification (e.g., SendNotif( ) to send a notification message directly to the unified application notification framework 501.

Other notifications may be received via operating system-level notification interception 508. Operating system-level notification interception 508 may rely on a notification API that is integrated into the operating system 505 to intercept any operating system-level notifications being sent from the application 504 to the operating system 505. The operating system 505 may be a virtual operating system instance such as the guest operating system 330 of FIG. 3. The notification API integrated into the operating system 505 (also referred to as an OS-level notification API) may be a part of the API provided by the operating system 505 that allows applications running on the operating system 505 to initiate a call and send a notification to the operating system 505. For example, a calendar application may notify the operating system 505 that a calendar event is imminent, or an instant messaging (IM) application may notify the operating system 505 of an incoming IM request from another user. In another example, a navigation application may notify and request permission from the operating system 505 to receive global positioning system (GPS) signals. Examples of operating system-level notification APIs include toast/tile/badge notification APIs in Windows operating system manufactured by Microsoft Corporation of Redmond, Wash., and libnotify library in Linux operating system.

The operating system-level notification may be intercepted by means of a notification interception layer 513. The notification interception layer 513 may be an application, a program, a service, a background process, and/or a foreground process that is tasked with monitoring for any OS API calls made by applications running on the operating system 505, and intercept or peek at those API calls for further processing. Processing the API calls may include creating a shadow notification of the original API call made by an application and/or forwarding the original to the operating system 505. The notification interception layer 513 may be implemented into the virtual machine 502 between the application 504 and the operating system 505 (e.g., OS notification APIs). Alternatively, the notification interception layer 513 may be a part of the operating system 505. In some other embodiments, the notification interception layer 513 may be included in the unified application notification framework 501. Each time the notification API is called by the application 504, a shadow notification, which is identical or substantially similar in content to the original notification call, may be generated by the notification interception layer 513 and sent to the unified application notification framework 501. The shadow notification may conform to the notification API native to the unified application notification framework 501 (which may be distinct from the OS-level notification API of the operating system 505) as discussed above in reference to the native notification API notification channel 507. For example, the shadow notification may be a duplicate copy of the original notification call or it may contain only part of the information included in the original notification call. The notification interception layer 513 may create shadow notifications for all or only part of the OS-level API calls intercepted. For example, the notification interception layer 513 may be programmed to ignore or filter out some API calls such as duplicative or repeated calls within a certain period of time. Other API calls may be ignored or filtered out based on their type, priority, size, etc. Alternatively, instead of generating and sending the shadow notification to the unified application notification framework 501, the notification interception layer 513 may intercept the original API call from the application 504 and forward the original API call to the unified application notification framework 501.

Still other notifications may be received via service-to-service notification channel 509. Service-to-service notification channel 509 refers to a communication channel for delivering notification messages from one service (e.g., a backend service) to another service (e.g., the unified application notification framework 501). Service-to-service notification 509 may rely on a backend service 511 (also referred to as a backing service) to send notifications directly to the unified application notification framework 501. In particular, application notifications may be generated and pushed by one or more backend services associated with the application. For example, the backend service 511 may be a mail server that pushes a message or notification to the application 504 (e.g., email client), which would then send its own notification message to the operating system 505. However, the unified application notification framework 501 may expose its interface (e.g., service-to-service notification channel 509) to the backend service 511 such that the backend service 511 can send notifications directly to the unified application notification framework 501. The backend service 511 may be a service provider (e.g., a third-party server) that provides services to the client device 503, the application 504, the operating system 505, and/or the virtual machine 502. Thus, the backend service 511 may consist of various hardware and/or software components, and may include, for example, a web server, a mail server, an application server, a messaging server, a location server, a content provider, an online streaming service, a social media service, a financial institute, a telecommunications service, an Internet service provider (ISP), a software-as-a-service (SaaS) provider, etc. that render services to the application 504. The backend service 511 may send out separate and possibly duplicate notifications to both the application 504 and the unified application notification framework 501, either simultaneously or in series. Alternatively, instead of the backend service 511 sending a notification message directly to the unified application notification framework 501, the virtual machine 502 may forward any notification messages, which were sent by the backend service 511, to the unified application notification framework 501. A service-to-service notification message may be sent via the network 512, such as the Internet. Since the backend service 511 is not part of the virtual machine 502, notifications that originate from the backend service 511 may be received by the unified application notification framework 501 even when the virtual machine 502 is offline or other unavailable for communication. For example, the backend service 511 such as a social media service, which has integrated the native API of the unified application notification framework 501, may send a friend request notification to the unified application notification framework 501, even when the virtual machine 502 is offline or out of service. In other examples, the service-to-service notification message may be a new email alert from an email server, a new instant message alert from an instant messaging server, a download complete message from a file transfer protocol (FTP) server, a deal alert from an online retailer, etc. The unified application notification framework 501 may then forward the friend request notification to the client device 503. The unified application notification framework 501 may also support notification multicasting such that applications can easily send notifications to all or a group of users. For example, a notification message through the service-to-service notification channel 509 may be sent out to multiple users through an API provided by the backend service 511 for the application 504.

The three communication channels (i.e., the notification API 507, operating system-level notification interception 508, and service-to-service notification 509) may be employed separately or concurrently. Even though the three communication channels illustrated herein may be logically distinct from each other, two or more of these communication channels may be physically combined into one communication channel. For example, the notification API call 507 and the OS-level interception 508 may share the same physical communication channel between the virtual machine 502 and the unified application notification framework 501. The notification API 507 and service-to-service notification 509 communication channels may require a third-party (e.g., application developer, backend service provider, etc.) to integrate specific code or instructions (e.g., native API for the unified application notification framework 501) while operating system-level notification interception 508 may pose no such requirements. In addition, the notification API 507 and operating system-level notification interception 508 communication channels may require that the application 504 be running (e.g., in background), while service-to-service notification 509 communication channel may be operable even when the application 504 and/or the virtual machine 502 are shut down because the service-to-service notification 509 originates from the backend service 511 that typically operates independently from the virtual machine 502. For example, when the backend service 511 such as an email server receives a new email for the user 506, the email server can send a new email alert message directly to the unified application notification framework 501 through service-to-service notification channel 509, and ultimately to the client device 503 even if the virtual machine 502 is offline or inoperable. Furthermore, when a notification associated with the application 504 is received from the backend service 511 via service-to-service notification channel 509 but the application 504 is not currently running on the virtual machine 502, the unified application notification framework 501 may cause the application 504 to run (e.g., sending a message or command to the virtual machine 502 to launch the application 504) on the virtual machine 502 (e.g., running as a background process) in order to accelerate user access. For example, when the user 506 receives a new email alert message at the client device 503 from the backend service 511 via the unified application notification framework 501 (i.e., service-to-service notification 509), the unified application notification framework 501 may preemptively launch the application 504 within the virtual machine 502 such that when the user 506 access the virtual machine 504 via the workspace in the client device 503, the application 504 would already be up and running in the virtual machine 502 and ready to display the new email, instead of the user 506 having to manually launch the application 504. Similarly, in response to the unified application notification framework 501 receiving a notification associated with the application 504 from the backend service 511 via the service-to-service notification channel 509, the unified application notification framework 501 may also cause the operating system 505 and/or the virtual machine 502 to run if they are not already running In particular, the unified application notification framework 501 may first determine whether the operating system 505 and/or the virtual machine 502 is currently operational (e.g., running, online, powered on, etc.), and if not, then cause the operating system 505 and/or the virtual machine 502 to be operational. This may be accomplished by transmitting, to the virtual machine 502 or a hypervisor associated with the virtual machine 502, a specific message or command (e.g., a data packet) that triggers the launch of the operating system 505 and/or the virtual machine 502. Such message or command may be sent via one of the three aforementioned communication channels or via a communication channel that is separate from the aforementioned communication channels.

Figure 6:
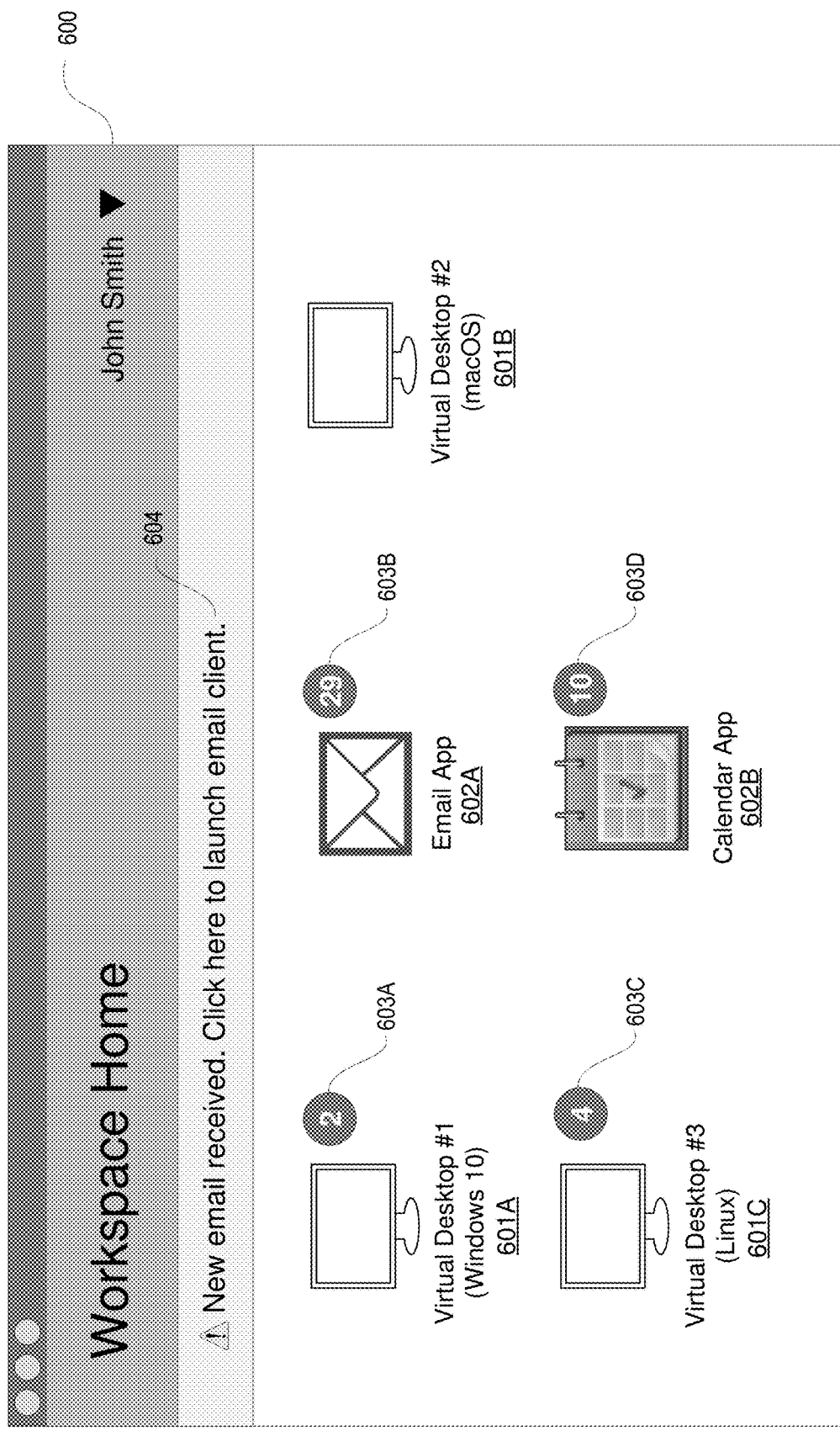
FIG. 6 depicts an illustrative user interface for a client device.

FIG. 6 depicts an illustrative user interface (UI) for a client device receiving notifications according to one or more aspects described herein. The client device may be, for example, the client device 503 of FIG. 5. The user of the client device may access a user interface, such as a workspace environment 600 (also referred to as a client workspace or a virtual environment) on the client device, to access one or more virtual machines, such as the virtual machine 502 of FIG. 5. Client workspace may be the frontend through which users can interact with virtual applications. The workspace environment 600 may be, for example, a web interface rendered in a web browser, a mobile app running on a mobile device, a desktop application running on a PC, a module integrated to an operating system of the client device (e.g., integrated to Windows File Explorer or macOS Finder). The workspace environment 600 may be part of a stand-alone application or a client application that communicates with a server. Specifically, the workspace environment 600 may be provided to the client device by a server, such as management server 410 of FIG. 4.

The user of the client device may interact with the workspace environment 600 to access a remote desktop (e.g., the operating system 505), a virtual application (e.g., the application 504), etc. In an example embodiment shown in FIG. 6, the workspace environment 600 may allow a user (e.g., "John Smith") to sign in and access one of UI elements (e.g., icons) that represent virtual desktop environments 601A, 601B, 601C (generally 601). For example, the virtual desktop 601A may be a virtual instance of Windows 10 operating system, the virtual desktop 601B may be a virtual instance of macOS operating system, and the virtual desktop 601C may be a virtual instance of Linux operating system. Thus, when the user selects, for example, the virtual desktop 601A on the workspace environment 600, a remote desktop graphical user interface (GUI) for the virtual instance of Windows 10 operating system, running on a remotely located computing device, may be launched and displayed on the client device.

Additionally, the workspace environment 600 may also include UI elements (e.g., icons) that represent virtual applications 602A, 602B (generally 602). For example, the virtual application 602A may be an email application running on a virtual machine (e.g., the virtual machine 502) provided by a remotely located computing device (e.g., server 206). In other examples, the virtual application 602B may be a calendar application. The virtual application 602A and the virtual application 602B may be running on the same or separate virtual machines. Thus, when the user selects, for example, the virtual application 602A on the workspace environment 600, the client device may display output generated by the corresponding virtual instance of email application executing on a remotely located computing device (e.g., server 206).

The workspace environment 600 may receive notifications from a unified application notification framework, such as the unified application notification framework 501 of FIG. 1. The notifications may have originated from an application, an operating system instance, or a backend service depending on which one of the three communication channels enumerated above was used for notification delivery. Once the notifications are received by the workspace environment 600, the workspace environment 600 may present the notifications to the user. For example, the notifications may be displayed visually (e.g., text, an icon, a pop-up, a dialog box, a status bar, a toast, a tile, a badge, an alert, a counter, etc.) or played audibly (e.g., an alarm, a ringtone, an audio alert, etc.). In the example embodiment shown in FIG. 6, the notifications are presented as badges 603A, 603B, 603C, 603D (generally 603) and a status bar 604.

The badges 603A, 603B, 603C, 603D may each indicate the number of notifications that have been received, from respective virtual desktops and virtual applications, but not cleared. Thus, for example, the badge 603A may indicate that there are currently two pending notifications from the virtual desktop 601A. These notifications may have originated from the virtual desktop 601A (i.e., virtual instance of operating system) itself or from any one of the applications running on the virtual desktop 601A. In another example, the badge 603B may indicate that there are currently 29 pending (i.e., uncleared) notifications from the virtual application 602A. Specifically, these notifications may represent 29 new unread email messages. Further, the lack of notification badge associated with the virtual desktop 601B may indicate that there are no notifications that were received in association with the virtual desktop 601B or that all of its notifications have been cleared. Finally, the workspace environment 600 may display a global notification message such as through the status bar 604.

Although badges 603 are used in the example embodiment illustrated in FIG. 6, other methods may be used to indicate the presence or lack of notifications with regard to the virtual desktop environments 601 and/or the virtual applications 602. For example, icons representing the virtual desktop environments 601 and/or virtual applications 602 may be highlighted, tinted, shaded, animated, enlarged, reduced, etc. to indicate the presence or lack of a pending (i.e., uncleared) notification. The icons may be visually altered in different manners depending on the number of notifications and/or priority of notifications. For example, an icon with a normal priority level notification may be displayed with a green badge while another icon with a high priority level notification may be displayed with a red badge. The badges 603 may be located on top, bottom, left, right, etc. of the icons or over the icons. Additionally, the icons may be automatically rearranged based on the notifications. For example, an icon with the highest notification count may be placed at a position that is most noticeable to the user, such as the top left position on the first page, and the remaining icons may be arranged in a descending order. In some example embodiments, when the user selects an icon with a notification, the content of the notification message may be displayed on the screen. In some example embodiments, when a mouse pointer hovers over an icon with a notification or a long touch input (i.e., touch and hold) is received over the icon, a preview of the notification message (e.g., a partial message) may be displayed.

Figure 7:
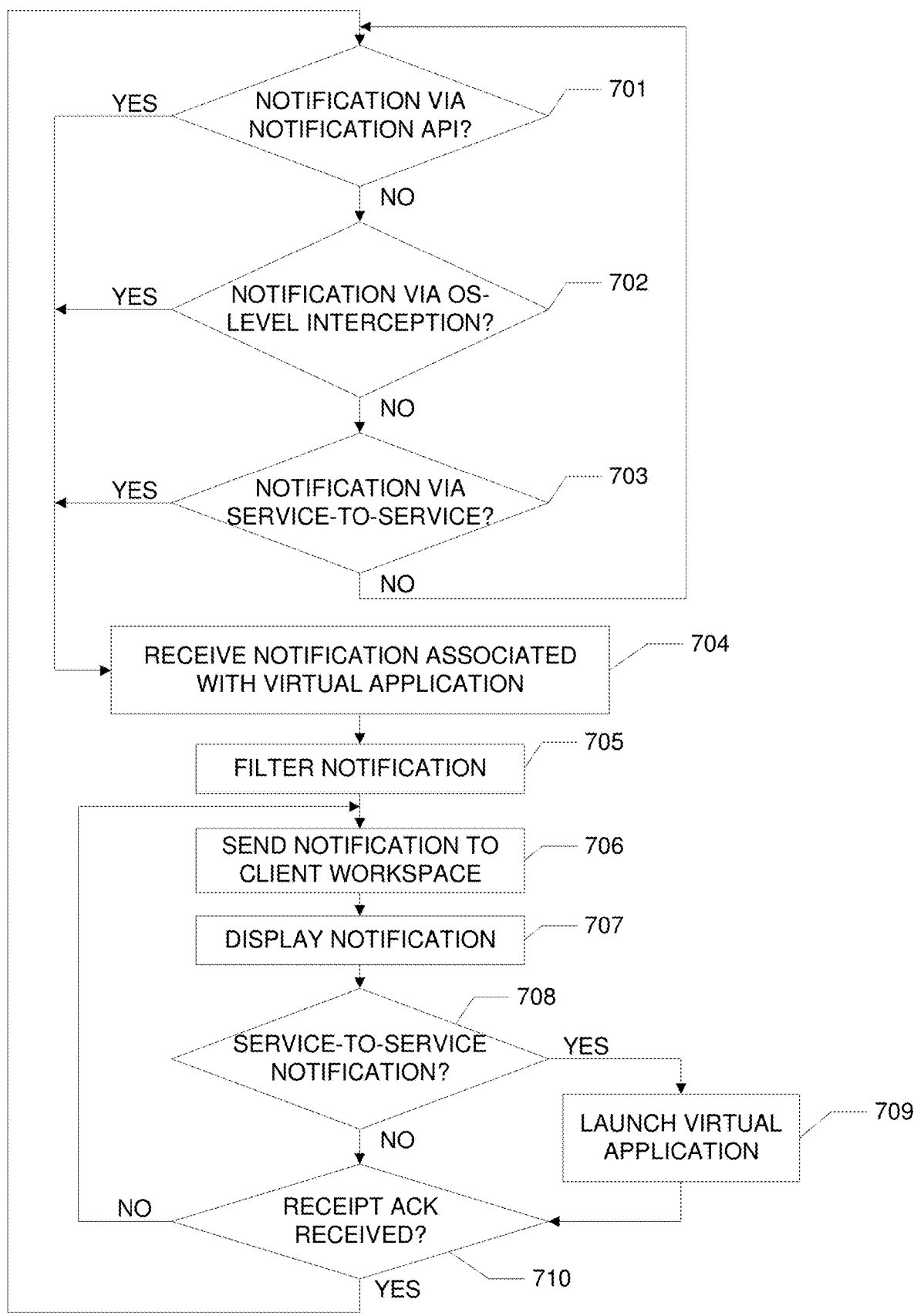
FIG. 7 depicts an illustrative method for providing a unified application notification framework.
Figure 8:
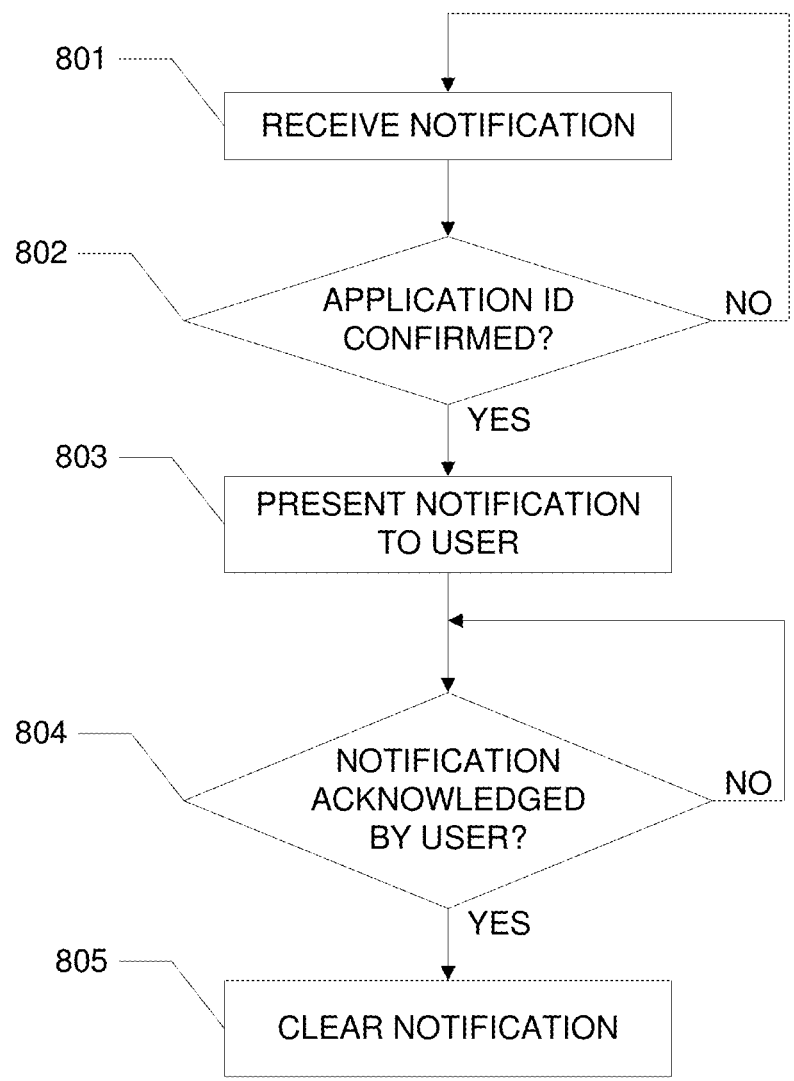
FIG. 8 depicts an illustrative method for receiving a notification by a client workspace.

Having disclosed some basic system components and concepts, the disclosure now turns to the example method embodiments shown in FIGS. 7 and 8. For the sake of clarity, the methods are described in terms of the unified application notification environment 500 as shown in FIG. 5 configured to practice the methods. However, any of the other devices or systems discussed above, such as computing environment 200, virtualization server 301, cloud computing environment 400, etc., may also perform any of the steps disclosed herein. The steps outlined herein are exemplary and can be implemented in any combination thereof, including combinations that exclude, add, or modify certain steps. For example, operations 701, 702, 703 of FIG. 7 may be performed in any order or two or more of operations 701, 702, 703 may be performed concurrently.

FIG. 7 depicts an illustrative method for providing a unified application notification framework. The example method of FIG. 7 may be performed by a unified application notification framework such as the unified application notification framework 501. First, the unified application notification framework may check if there are any notifications to receive via one of the communication channels available. Checking for and receiving notifications may be performed either synchronously or asynchronously. The unified application notification framework may periodically (e.g., every 1 second, 10 seconds, 1 minute, 5 minutes, 1 hour, etc.) poll to see if there is a pending notification, or the notification may be pushed to the unified application notification framework.

The unified application notification framework may determine if there is a notification to be received via the notification API channel (701). If there is one or more notification to be received, then the method proceeds to operation 704.

If not, the unified application notification framework may determine if there is a notification to be received via the operating system-level interception channel (702). If there is one or more notification to be received, then the method proceeds to operation 704. If not, the unified application notification framework may determine if there is a notification to be received via the service-to-service notification channel (703). If there is one or more notification to be received, then the method returns to operation 701, and the unified application notification framework continues to monitor for pending notifications.

At operation 704, the unified application notification framework may receive, via one of a plurality of communication channels, a notification associated with a virtual application. The plurality of communication channels may include the native notification API channel, the operating system-level notification interception channel, and/or the service-to-service notification channel.

For the unified application notification framework to receive the notification via the native notification API channel, the virtual application may need to request an API call. For example, when the application encounters a certain event (e.g., a new email received, a new instant message received, download complete, a critical error, etc.), the application may make a call (e.g., SendNotif( ) according to the API provided by the unified application notification framework. Then, an appropriate notification message (e.g., a data packet) may be transmitted from the application to the unified application notification framework according to the API. The notification message may be transmitted via a network such as the Internet.

When the notification is received via the operating system-level notification interception channel, the notification is received from a virtual operating system, on which the virtual application is executing. The notification may be generated based on a virtual notification sent by the virtual application to the virtual operating system. The virtual notification refers to an operating system-level notification message (e.g., Windows toast/tile/badge APIs, Linux libnotify library) that is generated by a virtual application to a virtual operating system. The notification (e.g., a shadow notification) may be generated by a notification interception layer (e.g., an application, a service, and/or a process executing on the virtual operating system and/or the virtual machine) after intercepting the virtual notification.

When the notification is received via the service-to-service notification channel, the notification may be received from a backend service (e.g., a third-party server such as a web server, an email server, a content server, etc.) that services the virtual application.

The unified application notification framework may determine an identifier (ID) for the received notification. The identifier may indicate the virtual application associated with the notification and/or the backend service. For example, the identifier may be an alphanumeric string that uniquely identifies the application within a certain namespace. The identifier may be inserted into the notification by the sender (e.g., application, notification interception layer, backend service, etc.) and extracted by the unified application notification framework. The unified application notification framework may store the received identifier in a database that stores associations between identifiers and applications. This database may be used later to, for example, identify duplicate notifications originating from the same application.

The unified application notification framework may filter the received notification (705). In other words, the received notifications may be triaged and notifications that do not satisfy certain conditions or thresholds may be filtered out. For example, after a notification associated with a virtual application is received, via one of the plurality of communication channels, the unified application notification framework may determine whether the notification satisfies a filtering criterion. The filtering criterion may include a notification type (e.g., toast, badge, pop-up, etc.), a communication channel type (e.g., notification API, operating system-level interception, service-to-service notification, etc.), an application type (e.g., an email client, an instant messenger, calendar app, etc.), time (e.g., time of receipt), priority (e.g., high priority, normal priority, low priority, etc.), and/or duplication (e.g., whether duplicate or similar notification has already been received recently). The notification may be discarded and thus not sent to a client workspace if the notification does not satisfy the filtering criterion. The filtering process may be performed based on the identifier included in the received notification.

The unified application notification framework may then send the received notification to a client workspace (706). The client workspace may be a web client, an application, a service, and/or an operating system. The unified application notification framework may also send other relevant information, such as the application identifier (ID) corresponding to the virtual application, a notification type (e.g., toast, badge, pop-up, etc.), a timestamp, notification priority information, etc. The additional information to be sent may be determined based on the communication channel type by which the notification was received. Alternative to sending the notification to the client workspace right away, the unified application notification framework may schedule the notification to be sent to the client workspace at a specific time (e.g., at 6:00 a.m. on Monday, 12 hours later, etc.). Once the notification is received at the client workspace, the workspace may display the notification (707). For example, the notification may be displayed as text, a pop-up, a dialog box, a status bar update, a badge, a toast, an icon, a tile, an alert, a counter, etc. The notification may be displayed partially (e.g., as a summary) or in full.

If the notification had been received via the service-to-service notification channel (708), then the unified application notification framework may launch the virtual application (709). In other words, the unified application notification framework may cause the virtual application to execute as a foreground or background process if it is not already running, in order to accelerate user access of the application. The unified application notification framework may first determine whether the virtual application is already executing on the virtual machine, and cause the virtual application to launch only when the virtual application is not executing. In addition, other appropriate actions by the virtual machine, the operating system, and/or the application may be triggered by the unified application notification framework when the service-to-service notification message is received, such as downloading a file, terminating an application, launching a related application, etc. For example, if a new update for a desktop application is available from a file server, the server may send a service-to-service notification to the client device via the unified application notification framework. At this time, the unified application framework may also cause the desktop application to be launched on the virtual machine so that the update of the application may be downloaded and/or installed even before the user reacts to the notification. If the notification was not received via the service-to-service notification channel, then the method proceeds to operation 710.

The unified application notification framework may determine whether the client workspace has sent a receipt acknowledgement in response to the notification sent (710). If sending the notification to the client workspace fails (e.g., the receipt acknowledgement is not received within a threshold time limit), then the notification may be saved (e.g., at the unified application notification framework) and a retry mechanism may be applied. For example, the notification may be resent immediately (706) or it may be scheduled to be resent to the client workspace at a later time. If the receipt acknowledgement is received from the client workspace within the threshold time limit, however, the unified application notification framework may mark the notification as cleared and also delete the notification from the unified application notification framework. Alternatively, the notification may be marked as cleared and deleted only after the notification has been acknowledged by the user of the client workspace.

FIG. 8 depicts an illustrative method for receiving a notification by a client workspace. The example method of FIG. 8 may be performed by a client workspace such as the client device 503. The client workspace may receive a notification from a unified application notification framework, such as the unified application notification framework 501 of FIG. 5 (801). The client workspace may send a receipt acknowledgement back to the unified application notification framework. The client workspace may extract the application ID included in the notification (802) to confirm whether the application ID matches one of the applications that are associated with the client workspace. If the application ID does not match, then the client workspace may discard the notification without further processing it. Thus, the method may return to operation 801 to monitor for any other notifications.

If a match is found with the application ID, then the client workspace may present the notification to the user (803). For example, the client workspace may display the notification message and/or play an alert sound as explained above. Optionally, the notification message may be encrypted by the unified application notification framework and decrypted by the client workspace for increased security. In particular, the encryption/decryption may be performed via symmetric or asymmetric cryptography. For example, the unified application may encrypt the notification message with the client's public key prior to transmission, and the client may decrypt the received notification message with its private key. At operation 804, the client workspace may then determine whether the notification has been acknowledged by the user (e.g., within a threshold time limit). The user may acknowledge the notification by, for example, dismissing the displayed notification message by clicking on it and/or accessing the virtual application associated with the notification. Alternatively, the notification may be automatically acknowledged without the user's intervention. If the notification is not acknowledged by the user, then the client workspace may continue to wait for its acknowledgement. However, once the notification is successfully acknowledged, the notification may be cleared from the client workspace (805). The client workspace may clear the notification by calling an operating system notification API for the virtual operating system, calling a native notification API for the unified application notification framework, and/or notifying the backend service, which would then call the native notification API. The unified application notification framework may then mark the notification as cleared. Once a message is cleared, the unified application notification framework would no longer try to deliver or redeliver the message to the client workspace.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
receiving, by a server, a notification from a service provider, wherein the service provider is associated with an application executable on a virtual machine, and wherein the virtual machine is part of a virtual environment that includes a user interface;
determining, by the server, an identifier for the received notification, wherein the identifier indicates the application associated with the service provider;
determining that the application is not executing on the virtual machine;
providing, by the server, the received notification to the user interface for display to a user, the received notification being displayed while the application is not executing on the virtual machine and not being accessed through the user interface; and
causing, by the server and based on the determination that the application is not executing on the virtual machine, the application to execute on the virtual machine.

2. The method of claim 1, wherein the determining the identifier comprises extracting, by the server, the identifier from the received notification.

3. The method of claim 1, wherein the service provider comprises a backend service that services the application.

4. The method of claim 1, wherein the service provider is at least one of a web server, a mail server, an application server, a messaging server, a location server, a content provider, an online streaming service, a social media service, a financial institute, a telecommunications service, an Internet service provider, or a software-as-a-service provider.

5. The method of claim 1, wherein the virtual environment allows the user to access the virtual machine from a client device.

6. The method of claim 1, wherein the virtual environment comprises at least one of a web client, an application, a service, or an operating system.

7. The method of claim 1, wherein the virtual environment, after receiving the provided notification, displays the notification for the user.

8. The method of claim 7, wherein the notification is displayed as at least one of text, an icon, a pop-up, a dialog box, a status bar, a toast, a tile, a badge, an alert, or a counter.

9. The method of claim 1, wherein the causing the application to execute on the virtual machine comprises transmitting, by the server and to the virtual machine, a command for launching the application.

10. The method of claim 1, wherein the method further comprises:
determining that the virtual machine is not operational; and
causing, by the server and to the virtual environment, the virtual machine to be operational by transmitting a command for launching the virtual machine.

11. The method of claim 1, wherein the method further comprises:
after receiving the notification, causing, by the server, the virtual machine to perform at least one of downloading a file, terminating the application, or launching a related application that is related to the application.

12. The method of claim 1, wherein the method further comprises:
scheduling the received notification to be provided to the virtual environment at a specific time.

13. The method of claim 1, wherein the method further comprises:
receiving, by the server, a second notification from the service provider;
determining that the second notification does not satisfy a filtering criterion; and
discarding the second notification without providing the second notification to the virtual environment.

14. The method of claim 13, wherein the filtering criterion comprises at least one of a notification type, a communication channel type, an application type, time, priority, or duplication.

15. A system comprising:
a memory; and
a processor coupled to the memory and configured to:
receive a notification from a service provider, wherein the service provider is associated with an application executable on a virtual machine, and wherein the virtual machine is part of a virtual environment that includes a user interface;
determine an identifier for the received notification, wherein the identifier indicates the application associated with the service provider; and
determine that the application is not executing on the virtual machine;
provide the received notification to the user interface for display to a user, the received notification being displayed while the application is not executing on the virtual machine and not being accessed through the user interface; and
cause, based on the determination that the application is not executing on the virtual machine, the application to execute on the virtual machine.

16. A non-transitory computer-readable storage medium storing instructions which, when executed by a processor, cause the processor to:
receive a notification from a service provider, wherein the service provider is associated with an application executable on a virtual machine, and wherein the virtual machine is part of a virtual environment that includes a user interface;
determine an identifier for the received notification, wherein the identifier indicates the application associated with the service provider;
determine that the application is not executing on the virtual machine;
provide the received notification to the user interface for display to a user, the received notification being displayed while the application is not executing on the virtual machine and not being accessed through the user interface; and
cause, based on the determination that the application is not executing on the virtual machine, the application to execute on the virtual machine.

* * * * *